(12) United States Patent
Teuwen

(10) Patent No.: US 9,419,803 B2
(45) Date of Patent: Aug. 16, 2016

(54) FLEXIBLE DATA AUTHENTICATION

(71) Applicant: NXP B.V., Eindhoven (NL)

(72) Inventor: Philippe Teuwen, Eterbeek (BE)

(73) Assignee: NXP B.V., Eindhoven (NL)

( * ) Notice: Subject to any disclaimer, the term of this patent is extended or adjusted under 35 U.S.C. 154(b) by 128 days.

(21) Appl. No.: 14/145,049

(22) Filed: Dec. 31, 2013

(65) Prior Publication Data

US 2015/0188712 A1 Jul. 2, 2015

(51) Int. Cl.
| | |
|---|---|
| *H04L 29/06* | (2006.01) |
| *H04L 9/32* | (2006.01) |
| *H04W 12/10* | (2009.01) |
| *G06K 7/10* | (2006.01) |
| *H04W 4/00* | (2009.01) |

(52) U.S. Cl.
CPC .......... *H04L 9/3247* (2013.01); *G06K 7/10267* (2013.01); *H04L 9/3236* (2013.01); *H04W 12/10* (2013.01); *H04L 63/12* (2013.01); *H04L 2209/72* (2013.01); *H04L 2209/80* (2013.01); *H04W 4/008* (2013.01)

(58) Field of Classification Search
USPC .......................................... 713/168, 170, 176
See application file for complete search history.

(56) References Cited

U.S. PATENT DOCUMENTS

| | | | | |
|---|---|---|---|---|
| 2010/0299527 | A1* | 11/2010 | Arunan et al. ................. | 713/176 |
| 2011/0248852 | A1* | 10/2011 | Falk ........................ | G06Q 10/08 340/572.1 |
| 2012/0207305 | A1* | 8/2012 | Gallo et al. .................... | 380/271 |
| 2014/0201849 | A1* | 7/2014 | Earley .............................. | 726/28 |
| 2014/0256254 | A1* | 9/2014 | Sarda et al. .................. | 455/41.1 |

FOREIGN PATENT DOCUMENTS

| | | |
|---|---|---|
| EP | 2131317 A1 | 12/2009 |
| EP | 2487629 A1 | 8/2012 |

OTHER PUBLICATIONS

NFC Forum Inc., Signature Record Type Definition Technical Specification, Signature 1.0, Nov. 18, 2010, pp. 1-14, Wakefield, M.A.
Crispin University of Washington C. Newman Sun Microsystems M: Internet Message Access Protocol (IMAP)—Urlauth—Extension: draft-crispin-imap-urlauth-08.txt, Jul. 1, 2004, No. 8, p. 4-p. 5.
European Search Report issued in EP 14199313 dated Apr. 24, 2015.

* cited by examiner

*Primary Examiner* — Joseph P Hirl
*Assistant Examiner* — Chi Nguy

(57) ABSTRACT

Various exemplary embodiments relate to a method, device, and storage medium including: receiving an NDEF message by an NFC device including a payload and at least one of a digital signature and a reference to a digital signature; stripping data from the payload to produce a stripped payload; verifying the payload using the digital signature and the stripped payload; and conditionally interpreting the payload based on whether the payload is verified. Various embodiments are described wherein: the payload includes a URI including a fragment denoted by a pound character; and stripping data includes stripping the fragment from the URI. Various embodiments are described wherein the payload is verified, the fragment comprises fragment data, and interpreting the payload comprises: transmitting a message requesting a resource identified by the URI, wherein the request omits the fragment data; executing a received script to transmit the fragment data to a device.

20 Claims, 8 Drawing Sheets

| | 210 | 220 | 230 | 240 | 250 | | | | | | |
|---|---|---|---|---|---|---|---|---|---|---|---|
| | NDEF HEADER | PAYLOAD LENGTH | TYPE LENGTH | TYPE | PAYLOAD | | | | | | |
| 370 | 10010001 | 0x59 | 0x1 | U | http://www.domain.com/page?id=0422334455667&counter=00001A | | | | | | |
| 375 | 00010001 | 0x36 | 0x1 | T | 0x2|en|TAG HAS BEEN ACCESSED ?26? TIMES. | | | | | | |
| 380 | 01010001 | 0x25 | 0x3 | Sig | 252 | 254 | 256 | 357 | 258 | 260 | 262 |
| | | | | | VERSION | URI PRESENT | SIGNATURE TYPE | PREPROCESSING TYPE | SIGNATURE LENGTH | SIGNATURE/URI | CERTIFICATE CHAIN |
| | | | | | 0x2 | 0 | 0000001 | 0x2 | 0x10 | 0x96E11D120F0E045D81CC | 0x96E1... |

FIG. 3

FLEXIBLE DATA AUTHENTICATION

TECHNICAL FIELD

Various exemplary embodiments disclosed herein relate generally to data authentication, more particularly but not exclusively, to authentication of data retrieved from a near field communication (NFC) tag.

BACKGROUND

Near field communication (NFC) tags have been adopted in a variety of products and other contexts to provide a heightened level of interactivity. For example, NFC tags embedded in so-called "smart posters" may enable a viewer to use their phone or other NFC-enabled device to receive a web address, coupons, interactive content, or other data associated with the poster. As this technology becomes more widely adopted, however, the opportunity for exploitation increases. Malicious parties may replace or rewrite existing NFC tags to carry instructions or other data intended to scam or attack the party reading the tag. For example, a smart poster tag may be rewritten to point to a different website established to fraudulently extract credit card information from the user.

To afford security to NFC communications, the NFC forum has put forward a technical specification defining procedures for digitally signing the data carried by an NFC tag. Such digital signatures may provide an added layer of authentication whereby, when data read from an NFC tag cannot be authenticated, the reading device may avoid using the data in a way that may open the device or user to exploitation.

SUMMARY

While the defined digital signature techniques may be sufficient for authenticating some types of static data, these techniques may not be useful for authenticating dynamic data and other types of static data. For example, where data held by the NFC tag changes during the life of the tag such as in, for example, a counter tracking the number of times the tag is read, the defined signature will no longer be valid after the carried data is updated. As another example, where NFC tags are each encoded during manufacture with a sequential identification number, it may be difficult to calculate a unique signature for each new tag to take into account the unique identification number. Accordingly, various embodiments described herein enable NFC data authentication where not all data may be known or available at the time of initial signature generation.

A brief summary of various exemplary embodiments is presented below. Some simplifications and omissions may be made in the following summary, which is intended to highlight and introduce some aspects of the various exemplary embodiments, but not to limit the scope of the invention. Detailed descriptions of a preferred exemplary embodiment adequate to allow those of ordinary skill in the art to make and use the inventive concepts will follow in later sections.

Various embodiments described herein relate to a method performed by a near field communications (NFC) device for verifying a record received from an NFC tag, the method including: receiving an NFC data exchange format (NDEF) message by the NFC device from the NFC tag, wherein the NFC message includes a payload and at least one of a digital signature and a reference to a digital signature; stripping data from the payload to produce a stripped payload; verifying the payload using the digital signature and the stripped payload; and conditionally interpreting at least one of the stripped payload and the payload based on whether the payload is verified.

Various embodiments described herein relate to a near field communications (NFC) device configured to verify a record received from an NFC tag, the NFC device including: an NFC reader configured to communicate with an NFC tag; and a processor configured to: receive an NFC data exchange format (NDEF) message via the NFC reader wherein the NFC message includes a payload and at least one of a digital signature and a reference to a digital signature; strip data from the payload to produce a stripped payload; verify the payload using the digital signature and the stripped payload; and conditionally interpret at least one of the stripped payload and the payload based on whether the payload is verified.

Various embodiments described herein relate to a non-transitory machine-readable medium encoded with instructions for execution by a near field communications (NFC) device for verifying a record received from an NFC tag, the non-transitory machine-readable medium including: instructions for receiving an NFC data exchange format (NDEF) message by the NFC device from the NFC tag, wherein the NFC message includes a payload and at least one of a digital signature and a reference to a digital signature; instructions for stripping data from the payload to produce a stripped payload; instructions for verifying the payload using the digital signature and the stripped payload; and instructions for conditionally interpreting at least one of the stripped payload and the payload based on whether the payload is verified.

Various embodiments are described wherein: the payload includes a uniform resource identifier (URI) including a fragment denoted by a pound character (#); and stripping data from the payload includes stripping the fragment from the URI.

Various embodiments are described wherein: the fragment includes fragment data, and interpreting the payload includes: transmitting a request message requesting a resource identified by the URI, wherein the request omits the fragment data; receiving, in response to the request, a script; executing the script to transmit the fragment data to at least one device other than the NFC device.

Various embodiments are described wherein: the payload includes a uniform resource identifier (URI) including a query string denoted by a question mark character (?); and stripping data from the payload includes stripping the query string from the URI.

Various embodiments are described wherein: the data is represented by a series of bits within the payload; and stripping data from the payload includes setting the series of bits to a value of zero.

Various embodiments are described wherein: the NDEF message further includes a preprocessing identifier that indicates preprocessing is to be performed; and the step of stripping data from the payload is performed in response to the presence of the preprocessing identifier that indicates preprocessing is to be performed.

Various embodiments are described wherein the preprocessing identifier identifies at least one of a first preprocessing type and a second preprocessing type, and the step of stripping data from the payload includes: performing preprocessing according to the first preprocessing type based on the preprocessing identifier identifying the first preprocessing type; and performing preprocessing according to the second preprocessing type based on the preprocessing identifier identifying the second preprocessing type.

Various embodiments are described wherein verifying the payload includes: computing a computed hash value based on signed data carried by the NDEF message, wherein the signed data includes the stripped payload; generating an expected hash value based on the digital signature; and determining whether the computed hash value matches the expected hash value.

BRIEF DESCRIPTION OF THE DRAWINGS

In order to better understand various exemplary embodiments, reference is made to the accompanying drawings, wherein:

FIG. 3 illustrates an alternative NDEF message enabling flexible data authentication;

To facilitate understanding, identical reference numerals have been used to designate elements having substantially the same or similar structure or substantially the same or similar function.

DETAILED DESCRIPTION

The description and drawings presented herein illustrate various principles. It will be appreciated that those skilled in the art will be able to devise various arrangements that, although not explicitly described or shown herein, embody these principles and are included within the scope of this disclosure. As used herein, the term, "or," as used herein, refers to a non-exclusive or (i.e., and/or), unless otherwise indicated (e.g., "or else" or "or in the alternative"). Additionally, the various embodiments described herein are not necessarily mutually exclusive and may be combined to produce additional embodiments that incorporate the principles described herein.

Figure 1:
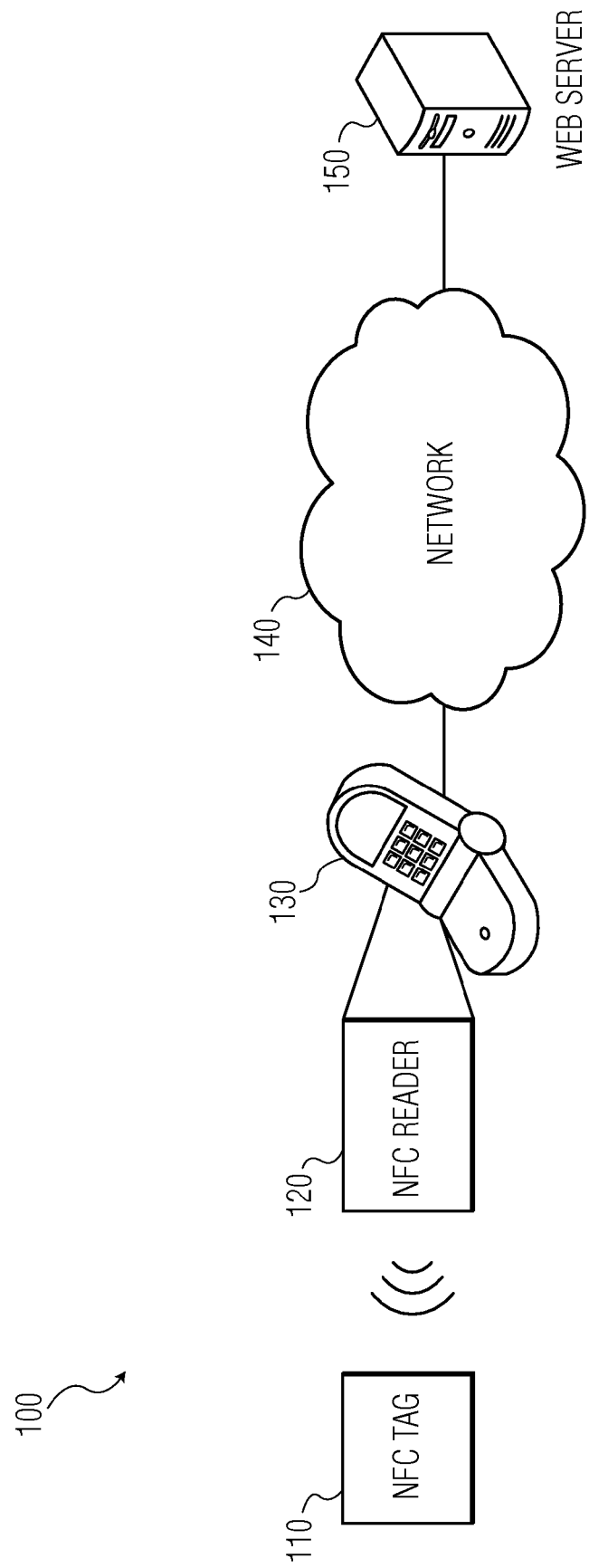
FIG. 1 illustrates an exemplary environment for near field communication (NFC) data authentication.

FIG. 1 illustrates an exemplary environment 100 for near field communication (NFC) data authentication. The environment 100 includes an NFC tag 110 that stores data to be authenticated. The NFC tag 110 may be affixed to or embedded in any item such as, for example, a smart poster or a consumer product. The environment also includes an NFC reader 120 as part of a user device 130 for reading data from the NFC tag 110. Accordingly, the user device 130 may be referred to as an "NFC device." The user device 130 may be any device capable of communication via a network 140, such as the Internet or a mobile carrier network. For example, the user device 130 may be a mobile phone, tablet, laptop, or personal computer. The NFC tag 110 and NFC reader 120 may be implemented according to any known hardware arrangement for implementing such devices.

The environment also includes a web server 150 accessible via the network 140. The web server 150 includes hardware and machine-executable instructions configured to receive and process requests for web pages and other resources sent by the user device 130 via the network 140. As such, the web server 150 may be a laptop, personal computer, server computer, server blade, cloud device, or other hardware device configured to operate as a network server.

It will be apparent that various systems other than the exemplary environment 100 illustrated may include fewer or additional of each of the components while implementing various features described herein for flexible NFC data authentication. For example, an alternative environment may include multiple NFC tags (not shown) storing multiple different data sets for different purposes, multiple NFC devices operated by different users, and multiple web servers hosting different web sites.

Having described the various components of the exemplary environment 100, a high-level example of the operation of the exemplary environment 100 will be provided. It will be apparent that the following example is of one embodiment and may also be an abstraction in some respects. Further details related to various implementations will be described in greater detail below with respect to FIGS. 2-8.

According to one example, the NFC tag 110 is affixed to a smart poster. The NFC tag 110 stores a digital signature and uniform resource identifier (URI) pointing to a website hosted by the web server 150. The URI includes a counter that is incremented each time the NFC tag 110 is read and, as such, the URI includes dynamic data that changes over the life of the NFC tag 110. The digital signature, however, was created at the time of manufacture of the NFC tag 110 based on the original version of the URI, with the counter set to a value of zero. Accordingly, after the URI has been modified, standard digital signature verification based on the URI will fail.

Continuing with the example, the user moves the user device 130 (and NFC reader 120) close to the NFC tag 110 and taps the user device 130 to initiate NFC data transfer. As a result, the user device 130 receives an NFC data exchange format (NDEF) message including both the signature and the URI. Prior to visiting the URI, the user device 130 performs authentication based on the digital signature to receive assurance that visiting the URI is safe. To begin authentication, the user device 130 modifies the URI to set the counter value to zero. From there, the user device 130 is able to use the digital signature to verify the authenticity of the URI. Having authenticated the URI, the user device 130 proceeds to access the web site hosted by the web server 150 via the unmodified URI.

Thus, the user device 130 in this example is enabled to verify the authenticity of data carried by a received NDEF message in spite of the signature being generated based on a different version of the data. It will be apparent that various details of the foregoing example may be modified while still implementing the various features of flexible authentication described herein. Some such variations will be apparent in view of the additional examples described below.

Figure 2:
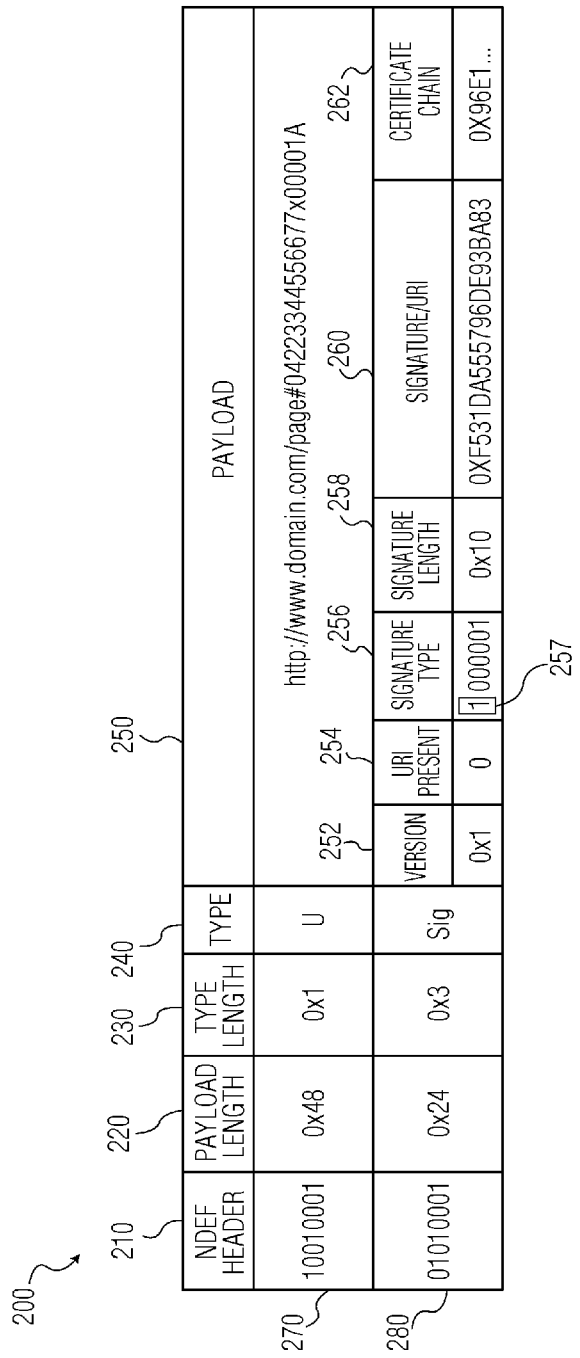
FIG. 2 illustrates an exemplary NFC data exchange format (NDEF) message enabling flexible data authentication.

FIG. 2 illustrates an exemplary NFC data exchange format (NDEF) message 200 enabling flexible data authentication according to a first embodiment. In various embodiments, the exemplary NDEF message 200 may describe the data stored on the NFC tag 110 and retrieved by the NFC reader 120 in the exemplary environment 100. The exemplary NDEF message 200 enables authentication with flexibility based on a URI fragment and provides backward compatibility with current standard full-message signing. As shown, the NDEF message includes two NDEF records 270, 280 that both have various standard fields: an NDEF header field 210, a payload length field 220, a type length field 230, a type field 240, and a payload field 250. The values stored within the fields 210-250 will be apparent in view of the applicable standards promulgated by, for example, the NFC forum, including any previous or future versions thereof. Further, various alternative embodiments may include additional or alternative fields as may be defined by previous, current, or future versions of the relevant standards or by proprietary, non-standard implementations.

The first NDEF record 270 of the NDEF message 200 has a payload indicating a URI to be visited by the reading device such as via a web browser. Specifically, the exemplary payload carries a URI of "http://www.domain.com/page#04223344556677x00001A." As will be understood, a URI syntax may include multiple parts such as a scheme name, hierarchical part, query string, and fragment. In the example of NDEF record 270, the payload URI includes a fragment, denoted by the pound sign character (#) of "04223344556677x00001A" that encodes various dynamic or static data. For example, the fragment may indicate a tag identifier of "04223344556677" (assigned at the time of manufacture) and a current counter value of "00001A" (assigned at the time of the most recent tag reading) indicating that the tag has been read 26 times. It will be apparent that virtually any information may be carried by the fragment and that the id and counter values are provided only as examples of data that may be desirable for exclusion from the authentication process.

The second NDEF record 280 of the NDEF record 280 has a payload indicating a signature to be used in authenticating the NDEF message 200 (or potentially, in alternative examples including additional records, portions thereof). In various embodiments, the location of the signature NDEF record 280 indicates to which other records 270 the signature NDEF record 280 applies. For example, in some embodiments, a signature NDEF record may be taken to apply to all preceding records that occur after the previous signature record (if any). In the case of the example NDEF message 200, the signature NDEF record 280 may be taken to apply to NDEF record 270 because NDEF record 270 is the only preceding record. Various other methods for determining to which records a signature record applies will be apparent.

The signature record 280 includes a payload divided according to a plurality of subfields: version field 252, URI present field 254, signature type field 256, signature length field 258, signature/URI field 260, and certificate chain field 262. The values stored within the subfields 252, 254, 256, 258, 260, 262 will be apparent in view of the applicable standards promulgated by, for example, the NFC forum, including any previous or future versions thereof. Further, various alternative embodiments may include additional or alternative fields as may be defined by previous, current, or future versions of the relevant standards or by proprietary, non-standard implementations. It will also be understood that various subfields may include further subfields. For example, the certificate chain field may include a certificate store subfield storing one or more digital certificates or a certificate URI field storing one or more URIs indicating from where applicable digital certificates may be retrieved.

In the example of the signature NDEF record 280, a digital signature of "0xF531DA555796DE93BA83" is stored. It will be understood that the signature NDEF record 280 may alternatively store a URI indicating from where an applicable digital signature may be retrieved and that the various features described herein may also be applied with respect to a remotely stored digital signature. The digital signature may be encrypted by a private key associated with a certificate stored or references in the certificate chain field. Further, the un- or non-encrypted digital signature may be previously generated based on a stripped version of the other NDEF record 270. As used herein, the term "stripped" will be understood to refer to a version of a record or other data having a portion thereof deleted, replaced with predetermined data, or otherwise modified to remove the portion from consideration in the process of digital signature verification. Further, the term "stripping" will be understood to refer to any process that may produce such a stripped version of data. In the example of the NDEF message 200, the signature of the signature NDEF record 280 may have been generated based on a version of the other NDEF record 270 having an alternative fragment "00000000000000x000000" or omitting the fragment entirely.

The signature NDEF record 280 also includes a preprocessing identifier 257 to indicate whether any preprocessing, such as stripping, should be performed as part of authenticating or otherwise verifying the NDEF record 270. In this example, the preprocessing identifier 257 is a most significant bit of the standard signature type field 256 where a "1" indicates that preprocessing fragment stripping should be performed while a "0" may indicate that no preprocessing should be performed thereby providing backward compatibility with current standard digital signing of NDEF records. It will be apparent that various alternative preprocessing identifiers may be used such as, for example, different or additional bits of the signature type subfield 256, one or more bits of other subfields such as the version subfield 252 or signature field 260, one or more bits of other signature NDEF record fields such as the NDEF header field 210 or type field 240, or additional specialized fields or subfields (not shown). Alternatively, the preprocessing identifier 257 may be omitted and one or more preprocessing types may always be performed as part of the implemented standard or non-standard implementation. Additional variations will be apparent.

FIG. 3 illustrates an alternative NDEF message 300 enabling flexible data authentication. In various embodiments, the exemplary NDEF message 200 may describe the data stored on the NFC tag 110 and retrieved by the NFC reader 120 in the exemplary environment 100. The alternative NDEF message 300 may be mostly similar to the previously-described NDEF message 200, differing in a few aspects that exemplify various alternative implementation details. It will be apparent that while multiple alternative implementation details are exemplified in the alternative NDEF message 300, these implementation details may not be dependent on one another and that only some such details may be incorporated into further alternative embodiments.

As shown, the alternative NDEF message 300 includes an alternative URI in the first NDEF record 370. In this alternative URI, the data to be stripped is stored as part of the query string, denoted by the question mark character (?), instead of the fragment. As such, the id and counter may be transmitted to the server to which the hierarchical part of the URI points as part of normal browser operation, unlike the data of a fragment as in the previous exemplary NDEF message which are typically not transmitted as part of a browser resource request.

The alternative NDEF message 300 includes an additional NDEF record 375 between the URI NDEF record 370 and signature NDEF record 380. The NDEF record 375 may be a text NDEF record, as defined by previous, current, or future standards or a proprietary, non-standard implementation. The text NDEF record 375 also includes dynamic information to be stripped prior to digital signature verification. As shown, the dynamic value is denoted on both sides by question mark characters (?). While the payload of the text NDEF message 275 may not follow URI syntax, the strippable field denoted by question mark characters (?) may nonetheless be referred to as a query string for the purposes of the flexible data authentication methods described herein. In a similar manner, if a pound sign character (#) were used instead, the strippable field may be referred to as a fragment for the purposes of the flexible data authentication methods described herein. In various embodiments, the right question mark character may indicate an end to the area to be stripped and suppress an NFC device from taking the rest of the record 375 as data to be stripped. Various alternative methods for defining portions of data to be stripped outside of portions defined by URI syntax will be apparent.

As noted above, according to various embodiments a signature NDEF record 380 may be applicable to, and therefore verifiable against, all preceding records in the NDEF message 300 that do not precede another signature NDEF record. As such, in the example of NDEF message 300, the signature "0x96E11D120F0E045D81CC" may be calculated based on stripped versions of both of the other NDEF records 370, 375. In a further alternative NDEF record, the signature NDEF record 380 may apply only to the text NDEF record 375 as indicated by the presence of another (possibly blank) signature NDEF record (not shown) between the URI NDEF record 370 and text NDEF record 375. Various other arrangements will be apparent.

The alternative NDEF message 300 also utilizes a dedicated preprocessing type field 357 to store a preprocessing identifier. For example, the payload of the signature NDEF message 380 may be provided with an additional byte to accommodate an additional field at a standardized location such as between the signature type field 256 and signature length field 258. Additionally, because the preprocessing identifier 357 includes multiple bits, as compared to the preprocessing identifier 257 of the first exemplary NDEF message 200, the preprocessing identifier 357 may identify more than two options for preprocessing. For example, a value of 0x0 may indicate no preprocessing is to be performed, a value of 0x1 may indicate that fragment stripping should be performed, a value of 0x2 may indicate that query string stripping should be performed, and a value of 0x3 may indicate that both fragment and query string stripping should be performed. Various additional forms of preprocessing will be apparent and capable of implementation according to the framework defined herein.

Figure 4:
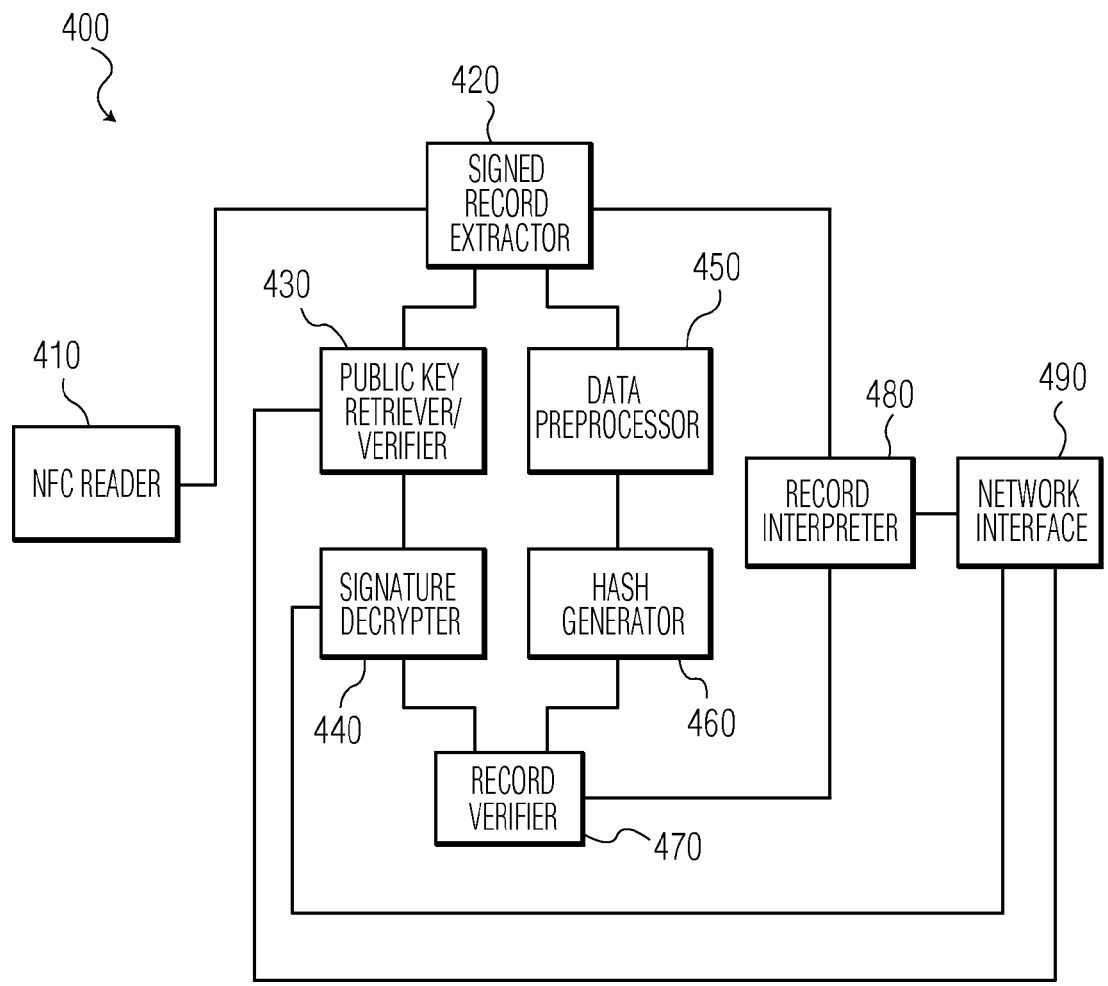
FIG. 4 illustrates an exemplary NFC device capable of performing flexible data authentication.

FIG. 4 illustrates an exemplary NFC device 400 capable of performing flexible data authentication. The exemplary NFC device 400 may correspond to the user device 130 of the exemplary environment 100. The NFC device 400 may be in some respects an abstraction; it will be understood that the various components of the NFC device 400 may be implemented by hardware devices. Exemplary hardware for supporting the components of the NFC device 400 will be described in greater detail below with respect to FIG. 5.

The exemplary NFC device 400 includes an NFC reader 410 for communicating with one or more NFC tags. The NFC reader 410 includes hardware and software configured to communicate according to the NFC protocol. Upon reading an NDEF message from an NFC tag, the NFC reader 410 passes the NDEF message to a signed record extractor 420.

The signed record extractor 420 includes hardware and software configured to identify any signed record groupings within the NDEF message. For example, the signed record extractor 420 may scan the NDEF message for any NDEF signature records and, if any are found, extract the non-blank NDEF signature records together with the groups of additional NDEF records to which respective NDEF signature records apply. As described above, the group of NDEF records to which an NDEF signature record applies may be all NDEF records preceding the signature NDEF record that do not also precede an earlier NDEF signature message. If no signed records are located, the signed record extractor 420 passes the NDEF message directly to a record interpreter 480, as no signature verification is to be performed. However, if signed records are located, the signed record extractor 420 passes each group of records, including the signature record, to a public key retriever/verifier 430 and data preprocessor. 450.

The public key retriever/verifier 430 includes hardware and software configured to retrieve or verify a public key associated with a signature NDEF record. For example, where the signature NDEF record does not carry a public key, the public key retriever/verifier 430 communicates with a certificate authority via the network interface 490 based on a certificate carried or referenced by the signature NDEF records to retrieve a public key. Where the signature NDEF record does carry a public key, the public key retriever/verifier 430 communicates with a certificate authority via the network interface 490 based on a certificate carried or referenced by the signature NDEF records to verify that the public key is actually associated with the certificate. If the public key cannot be verified, the public key retriever/verifier 430 marks the records in the current signed record group as invalid and not authenticated for interpretation. Otherwise, the public key retriever/verifier 430 passes the public key and signature NDEF record to a signature decrypter 440.

The signature decrypter 440 includes hardware and software configured to decrypt a signature value using a public key. As such, the signature decrypter 440 is configured to extract a signature from a signature NDEF message or retrieve, via the network interface 490, a digital signature identified by a URI carried by the signature NDEF message. Thereafter, the signature decrypter 440 decrypts the digital signature using the public key associated with the signature NDEF record (as determined by the public key retriever/verifier 430) to obtain an expected hash value previously computed, encrypted, and stored during manufacture of the NFC tag. The signature decrypter 440 then passes the expected hash value to a record verifier 470.

The data preprocessor 450 includes hardware and software configured to perform various preprocessing on the signed NDEF records as specified by a preprocessing identifier of the signature NDEF record. For example, where the preprocessing identifier indicates that no preprocessing is to be performed, the data preprocessor 450 may pass the signed record group to a hash generator 460. As another example, where the preprocessing identifier indicates that one or more types of data, such as fragments or query strings, are to be stripped from the signed record group, the data preprocessor 450 may strip any such types of data from the non-signature NDEF records in the group. For example, where the preprocessing identifier indicates that fragment stripping should be performed, the data preprocessor 450 may locate any fields denoted by a hash character (#) and remove the data or set the data equivalent to zero or another predetermined static value. After performing the indicated preprocessing, the data preprocessor 450 passes the signed record group, as preprocessed if at all, to a hash generator 460.

The hash generator 460 includes hardware and software configured to calculate a hash value from the non-signature NDEF records within the signed record group. In various embodiments, the signature NDEF record identifies one of a plurality of hash algorithms to be used. The hash generator 460 applies the hash algorithm to the non-signature NDEF records to generate a computed hash value and passes the computed hash value to the record verifier.

The record verifier 470 includes hardware and software configured to determine whether a computed hash value matches an expected hash value. Upon receiving both an expected hash value from the signature decrypter 440 and a computed hash value from the hash generator 460, the record verifier 470 determines whether the expected hash value and computed hash value are equivalent or otherwise match. If so, the records within the signed record group are successfully authenticated. If not, the verification has failed, and the record verifier 470 may mark the NDEF records within the group as invalid and not to be interpreted. Various alternative methods for preventing interpretation of records that fail verification will be apparent. After performing verification on all identified signed record groups, the record verifier 470 passes the NDEF message to the record interpreter 480. Alternatively, the record verifier 470 may pass only indications of whether NDEF messages are invalid to the record interpreter 480 while the record interpreted 480 receives the entire NDEF message or records therefrom from another component such as the NFC reader 410 or signed record extractor 420.

The record interpreter 480 includes hardware and software configured to conditionally interpret one or more NDEF records within an NDEF record. As such, the record interpreter 480 first selects a non-signature NDEF record for interpretation. For example, the record interpreter 480 may determine the number of times the user tapped the user device 400 to initiate NFC, and select the non-signature NDEF record associated with this number of taps. Various alternative methods for selecting an NDEF record will be apparent. Next, the record interpreter 480 conditionally interprets the selected NDEF record by first determining whether the NDEF record has been marked invalid. If so, the record interpreter 480 may return an error, select a next NDEF record for conditional interpretation, perform no action, or take another action. If the NDEF record is not marked invalid, the record interpreter 480 proceeds to perform one or more actions specified by the record. In various embodiments, the record interpreter 480 performs actions based on the initial version of the NDEF record that was unmodified by any preprocessing or other processing, while in other embodiments, the record interpreter 480 may perform the actions based on the modified version of the NDEF record. For example, where the NDEF record is a URI record, the record interpreter 480 may invoke a web browser (not shown) with an instruction to access the specified URI. Alternatively, interpretation of an NDEF record may include making a call to the operating system (not shown) or executing another application (not shown). Various other methods for conditionally interpreting an NDEF record based on the outcome of record verification will be apparent. For example, when an NDEF record is marked invalid, it may be excluded from selection for interpretation.

The network interface 490 may include one or more devices for enabling communication with other hardware devices. For example, the network interface 490 may include a cellular antennae configured to communicate according to a 3G or 4G network protocol or a network interface card (NIC) configured to communicate according to the Ethernet protocol. Additionally, the network interface 490 may implement a TCP/IP stack for communication according to the TCP/IP protocols. Various alternative or additional hardware or configurations for the network interface 490 will be apparent.

Figure 5:
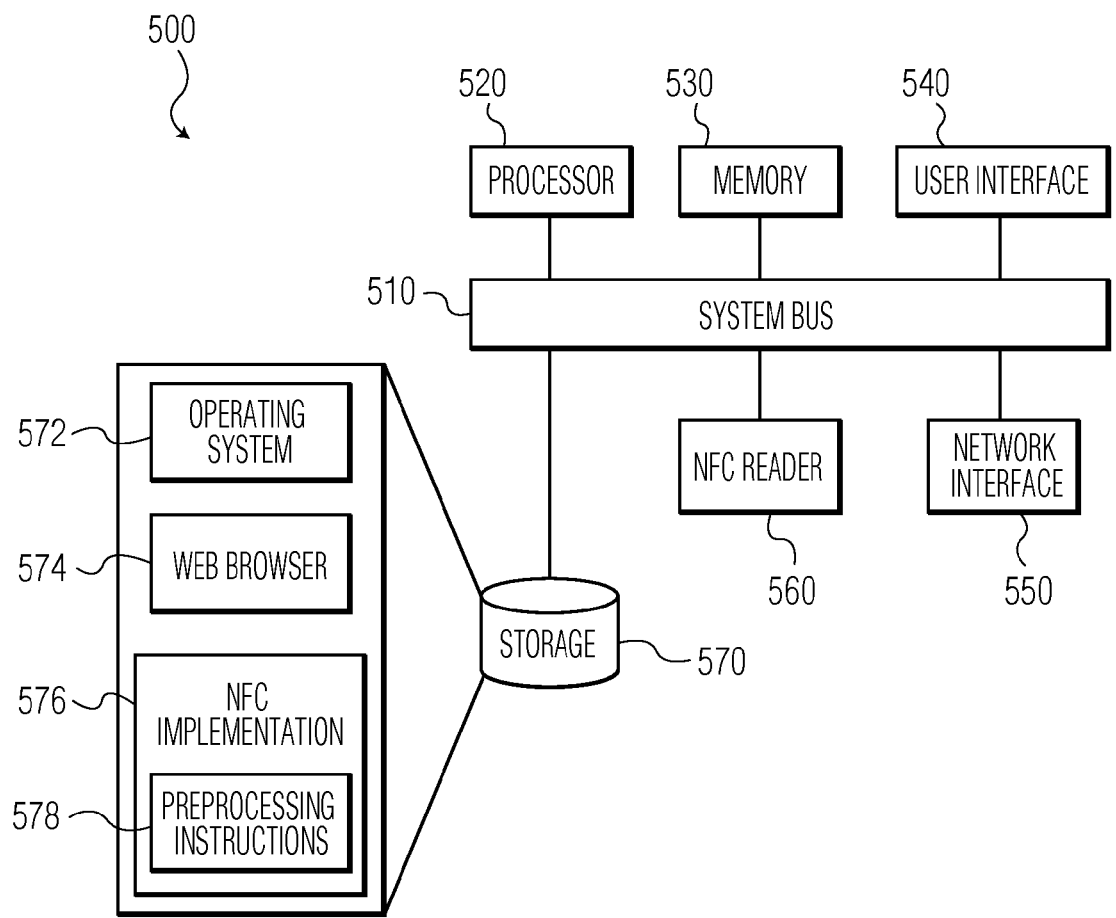
FIG. 5 illustrates an exemplary hardware diagram for an NFC device capable of performing flexible data authentication.

FIG. 5 illustrates an exemplary hardware diagram for an NFC device 500 capable of performing flexible data authentication. The NFC device 500 may correspond to the user device 130 of FIG. 1 or NFC device 400 of FIG. 4. As shown, the NFC device 500 includes a processor 520, memory 530, user interface 540, network interface 550, NFC reader 560, and storage 570 interconnected via one or more system buses 510. It will be understood that FIG. 5 constitutes, in some respects, an abstraction and that the actual organization of the components of the NFC device 500 may be more complex than illustrated.

The processor 520 may be any hardware device capable of executing instructions stored in memory 530 or storage 560. As such, the processor may include a microprocessor, field programmable gate array (FPGA), application-specific integrated circuit (ASIC), or other similar devices.

The memory 530 may include various memories such as, for example L1, L2, or L3 cache or system memory. As such, the memory 530 may include static random access memory (SRAM), dynamic RAM (DRAM), flash memory, read only memory (ROM), or other similar memory devices.

The user interface 540 may include one or more devices for enabling communication with a user such as a consumer or an administrator. For example, the user interface 540 may include a display, a mouse, a touch screen, or a keyboard for receiving user commands.

The network interface 550 may include one or more devices for enabling communication with other hardware devices. For example, the network interface 550 may include a network interface card (NIC) configured to communicate according to the Ethernet protocol. As another example, the network interface 550 may include an antenna for communication via a wireless protocol such as, for example, 3G or 4G cellular networks. Additionally, the network interface5750 may implement a TCP/IP stack for communication according to the TCP/IP protocols. Various alternative or additional hardware or configurations for the network interface 550 will be apparent.

The NFC reader 560 may include hardware adapted to read or otherwise communicate with an NFC tag. Various hardware arrangements for implementing an NFC reader 560 will be apparent.

The storage 560 may include one or more machine-readable storage media such as read-only memory (ROM), random-access memory (RAM), magnetic disk storage media, optical storage media, flash-memory devices, or similar storage media. The storage 560 may store various sets of instructions for execution by the processor 520. For example, the storage 570 may include operating system instructions 572 for coordinating various basic functionality of the NFC device 500 and web browser instructions 574 for requesting and retrieving web resources, such as web pages, and executing scripts, such as JavaScript. Further, the storage 570 may also include NFC implementation instructions 576, including preprocessing instructions 578, for interpreting and flexibly authenticating NDEF messages according to the various methods described herein. It will be apparent that various alternative NFC implementation instructions may not use the specific authentication methods described herein but may nonetheless utilize the preprocessing instructions 578 to preprocess data prior to other steps involved in the alternative authentication methods.

It will be apparent that various information described as stored in the storage 570 may be additionally or alternatively stored in the memory 530. In this respect, the memory 530 may also be considered to constitute a "storage device." Various other arrangements will be apparent. Further, the memory 530 and storage 570 may both be considered to be "non-transitory machine-readable media." As used herein, the term "non-transitory" will be understood to exclude transitory signals but to include all forms of storage, including both volatile and non-volatile memories.

While the NFC device 500 is shown as including one of each described component, the various components may be duplicated in various embodiments. For example, the processor 520 may include multiple microprocessors that are configured to independently execute the methods described herein or are configured to perform steps or subroutines of the methods described herein such that the multiple processors cooperate to achieve the functionality described herein. In some embodiments, such as those wherein the NFC device 500 is implemented at least partially in a cloud computing architecture, components may be physically distributed among different devices. For example, the processor 520 may include a first microprocessor in a data center and a second microprocessor in a second data center. Various other arrangements will be apparent.

Figure 6:
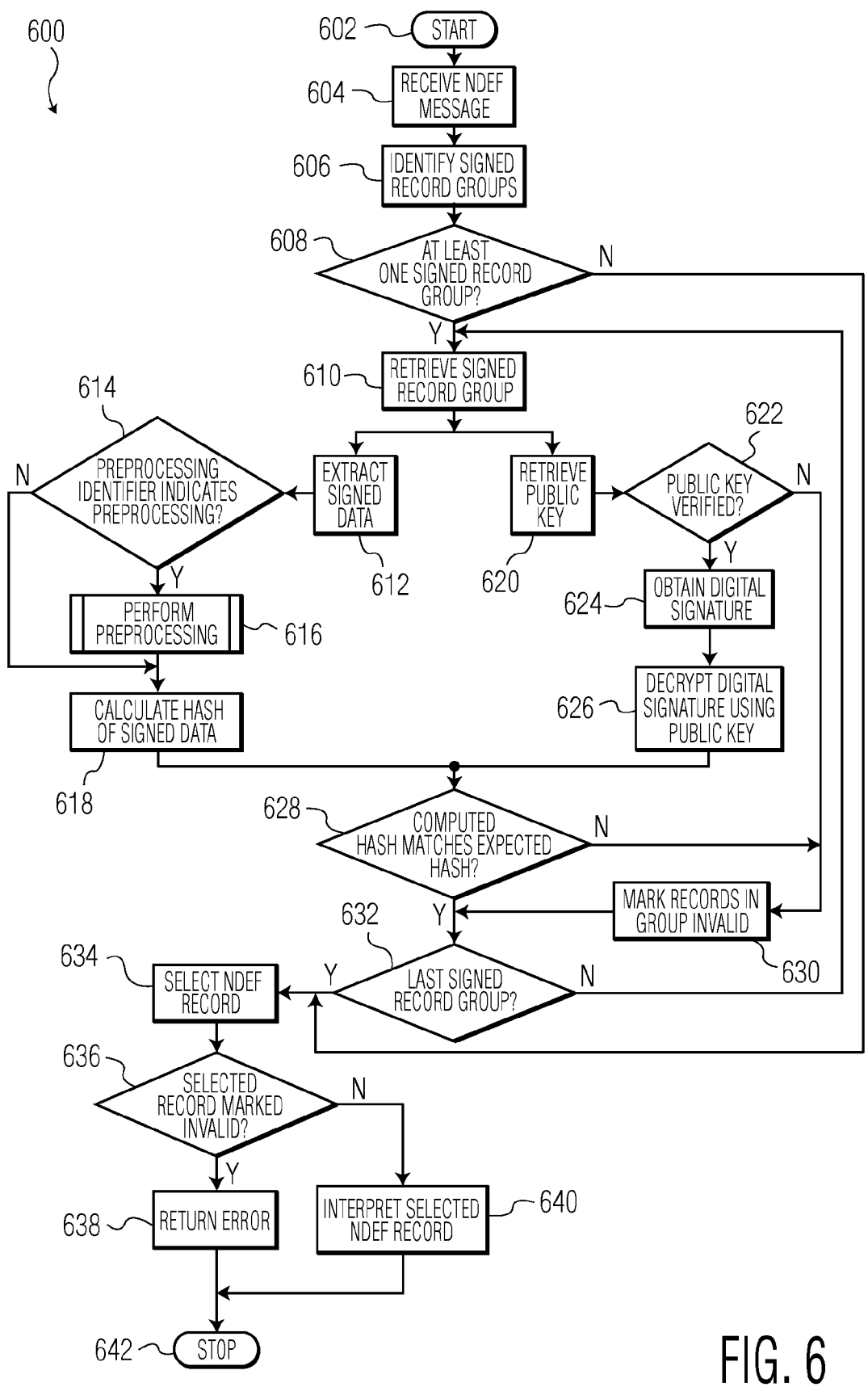
FIG. 6 illustrates an exemplary method for performing flexible data authentication.

FIG. 6 illustrates an exemplary method 600 for performing flexible data authentication. The method 600 may be performed by an NFC device, such as the user device 130, NFC device 400, or NFC device 500. In some embodiments, the method 600 may be implemented as part of an NFC/NDEF implementation on an NFC device. It will be apparent that, in various alternative embodiments, method 600 or portions thereof may be performed outside of a base NFC/NDEF implementation such as, for example, by a standalone flexible authentication application.

The method 600 begins in step 602 and proceeds to step 604 where the NFC device receives an NDEF message from an NFC tag. Next, in step 606, the NFC device identifies any signed record groups within the NDEF message. For example, the NFC device may locate any groups of NDEF messages preceded by either the beginning of the NDEF message or a signature NDEF record and terminating with a non-blank signature NDEF record. In step 608, the NFC device determines whether the NDEF record includes at least one signed record group, such that authentication or other verification should be performed. If no signed records are present, the method 600 may skip past the verification process to step 634. Otherwise, the method 600 proceeds to step 610.

In step 610, the NFC device retrieves a first signed record group to process. Next, the method 600 forks and proceeds to process two threads in parallel. It will be apparent that alternative methods may not use such multi threading and, instead, may define one of many possible sequences of steps 612-626 to achieve results similar to those described herein. Further reorganizations and departures from the example shown that incorporate the features described herein will be apparent.

In the first exemplary thread, the NFC device extracts, in step 612, signed data from the signed record group. For example, the NFC device may extract the payloads from the non-signature NDEF records or the non-signature NDEF records themselves. Next, in step 614, the NFC device determines whether a preprocessing identifier of the signature NDEF record in the signed record group indicates that preprocessing should be performed. If no preprocessing should be performed, the method 600 skips ahead to step 618. Otherwise, the NFC device proceeds to perform the indicated preprocessing in step 616 and proceeds to step 618. An exemplary method for performing preprocessing will be described in greater detail with respect to FIG. 7.

In step 618, the NFC device calculates a hash value based on the signed data, as stripped or otherwise preprocessed if so indicated by the preprocessing identifier. For example, the NFC device may identify a hash algorithm to apply based on the signature NDEF record and apply the algorithm to the signed data to generate a computed hash value. The first thread then attempts to rejoin the second thread, potentially waiting for the second thread to finish execution.

In the second exemplary thread, the NFC device retrieves a public key in step 620 by, for example, extracting the public key from a certificate or retrieving the public key from a certificate authority. In step 622 the NFC device determines whether the public key is verified. For example, if the public key was received from the certificate authority, or matches a key received from the certificate authority, the NFC device may determine that the public key is verified. If the public key is not verified, the threads may rejoin or the first thread may be instructed to terminate and the method 600 proceeds to step 630. Otherwise, the NFC device obtains an encrypted digital signature by, for example, extracting a digital signature from the signature NDEF record or retrieving a signature based on a URI carried by the signature NDEF record. Then, in step 626, the NFC device decrypts the digital signature using the public key to produce an expected hash value. The second thread then attempts to rejoin the first thread, potentially waiting for the first thread to finish execution.

After the two threads have finished execution and rejoined into a single thread (or, in alternative embodiments, after generation of the computed hash value and expected hash value according to an alternative, single thread implementation) the NFC device determines, in step 628, whether the computed hash matches the expected hash. For example, the NFC device may determine whether the two values are equivalent. If the hash values do not match, the method proceeds to step 630 where each non-signature NDEF record in the signed record group is marked as invalid and not to be interpreted. After marking the records invalid or after determining that the hash values match, the method proceeds to step 632 where the NFC device determines whether additional signed record groups remain for authentication. If so, the method 600 loops back to step 610 where the NFC device retrieves a next signed record group to process.

After all signed record groups have been processed, the method 600 proceeds to step 634 where the NFC device selects an NDEF record from the processed NDEF message for interpretation. For example, the NFC device may select a non-signature NDEF record having an index matching the number of taps input by the user to initiate NFC. Then, in step 636, the NFC device determines whether the selected record has been marked invalid. If so, the NFC device returns an error in step 638 and the method proceeds to end in step 642. Otherwise, the NFC device interprets the selected NDEF record in step 640 and the method proceeds to end in step 642. Interpretation may involve various actions such as, for example, invoking an OS function, launching a web browser with an instruction to access a URI, or launching a specified application. Various other results of NDEF record interpretation will be apparent. In various embodiments, the NFC device performs actions based on the initial version of the NDEF record that was unmodified by any preprocessing or other processing, while in other embodiments, the record interpreter 480 may perform the actions based on the modified version of the NDEF record.

Figure 7:
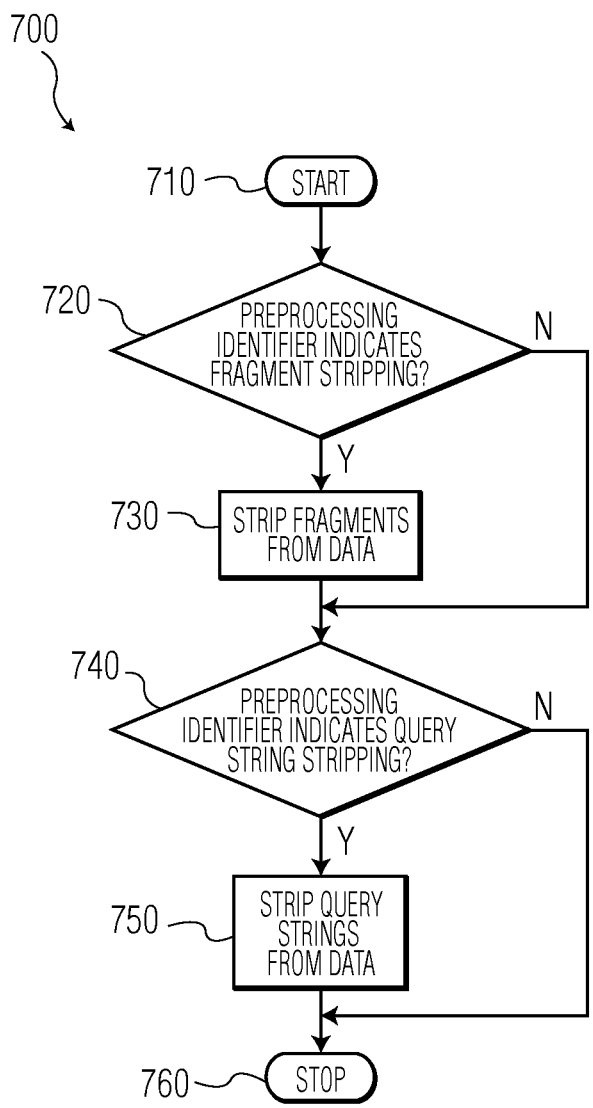
FIG. 7 illustrates an exemplary method for performing data preprocessing.

FIG. 7 illustrates an exemplary method 700 for performing data preprocessing. The method 700 may be performed by an NFC device, such as the user device 130, NFC device 400, or NFC device 500. In some embodiments, the method 700 may be implemented as part of an NFC/NDEF implementation on an NFC device. It will be apparent that, in various alternative embodiments, method 700 or portions thereof may be performed outside of a base NFC/NDEF implementation such as, for example, by a standalone flexible authentication application. In some embodiments, the method 700 corresponds to step 616 of the exemplary method 600 for performing flexible NDEF record authentication.

The method 700 begins in step 710 and proceeds to step 720 where the NFC device determines whether the preprocessing identifier indicates that fragment stripping should be performed. For example, if a bit in the preprocessing identifier associated with fragment stripping is set to "0," the NFC device may determine that fragment stripping should not be performed and the method 700 may skip ahead to step 740. If the bit is set to "1," the NFC device may determine that fragment stripping should be performed and the method 700 may proceed to step 730. In step 730, the NFC device performs fragment stripping by, for example, setting any fragment data as denoted by the pound sign character (#) and specified by the URI syntax to an equivalent length zero value. Alternatively, the NFC device may delete the fragment data or set the fragment data to another predetermined static value. Further, in some embodiments, the NFC device may strip any data denoted by a pound sign character (#) regardless of whether the "fragment" occurs in a URI.

In step 740, the NFC device determines whether the preprocessing identifier indicates that query string stripping should be performed. For example, if a bit in the preprocessing identifier associated with fragment stripping is set to "0," the NFC device may determine that query string stripping should not be performed and the method 700 may skip ahead to end in step 760. If the bit is set to "1," the NFC device may determine that query string stripping should be performed and the method 700 may proceed to step 750. In step 750, the NFC device performs query string stripping by, for example, setting any query string data as denoted by the question mark character (?) and specified by the URI syntax to an equivalent length zero value. Alternatively, the NFC device may delete the query string data or set the query string data to another predetermined static value. Further, in some embodiments, the NFC device may strip any data denoted by a question mark character (?) regardless of whether the "query string" occurs in a URI. The method 700 then proceeds to end in step 760.

As noted above, data carried in a URI fragment typically is not transmitted to the web server to which the URI points according to initial resource request and receipt. In some embodiments, however, the web server may utilize at least some of the data carried by the fragment to provide or enhance the interactive experience with the user. As such, in various embodiments, the web server is configured to enable an NFC device to transmit fragment data to the web server and thereby enable such interactivity.

Figure 8:
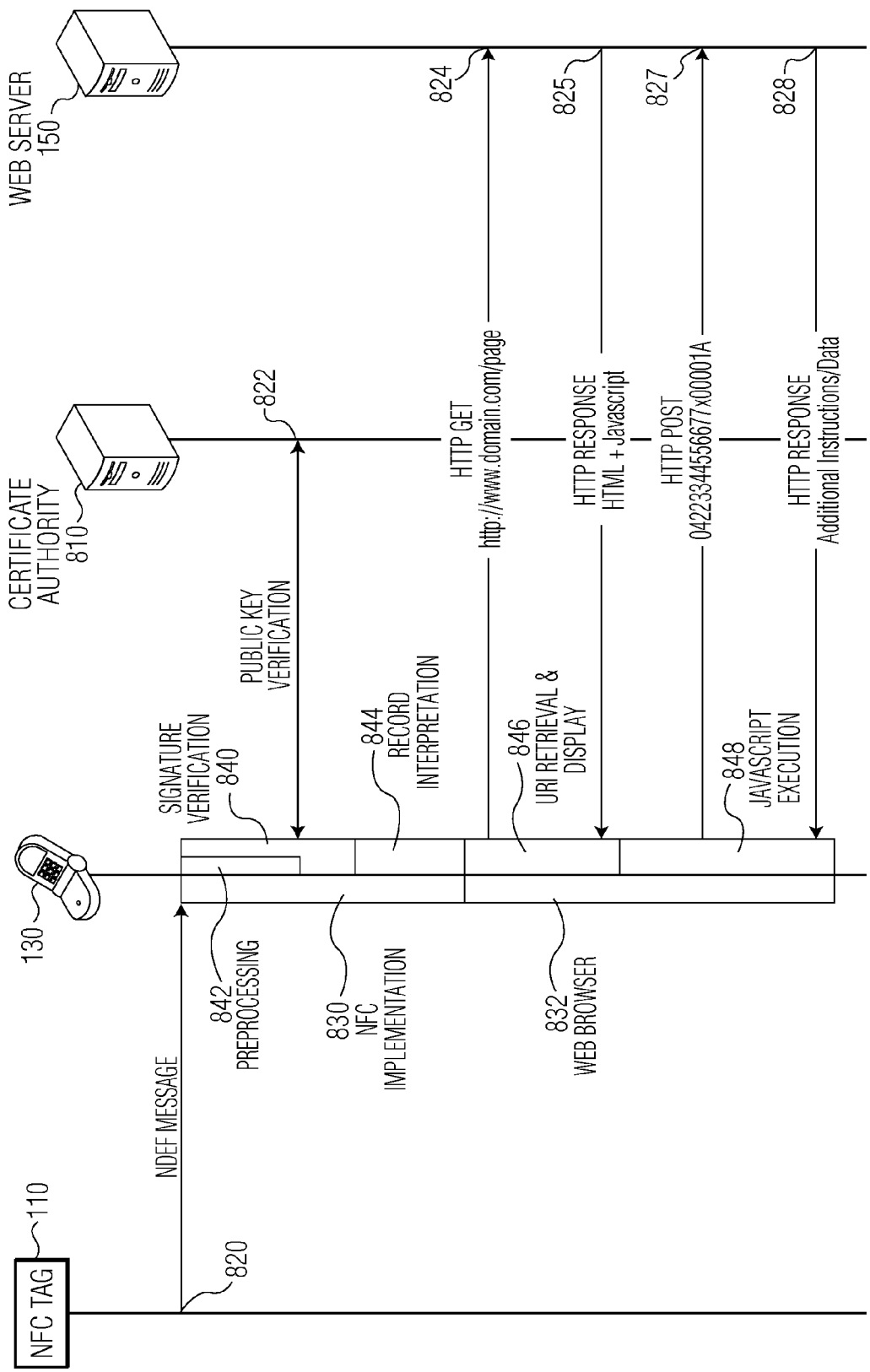
FIG. 8 illustrates an exemplary message exchange for performing flexible data authentication and submitting dynamic data to a server.

FIG. 8 illustrates an exemplary message exchange 800 for performing flexible data authentication and submitting dynamic data to a server. The exemplary message exchange 800 may occur between the NFC tag 110, user device 130, and web server 150 of the exemplary environment 100 and a certificate authority server 810.

The exemplary message exchange 800 begins when the user device 130 receives an NDEF message 820 from the NFC tag 110 in response to user NFC initiation. According to the example of FIG. 8, the NDEF message 820 may correspond to the exemplary NDEF message 200. The NFC implementation 830 on the user device 130 then performs signature verification 840, including any identified preprocessing 842, according to any of the methods described herein or variations thereof. Further, as part of the signature verification 840, the user device 130 communicates with the certificate authority 810 to retrieve or verify a public key 822. After performing verification, the NFC implementation 830 moves on to record interpretation 844 and, based on the URI NDEF record 270, invokes the web browser 832 with an instruction to access the URI "http://www.domain.com/page#04223344556677x00001A."

After invocation, the web browser 832 performs URI retrieval and display by constructing and transmitting an HTTP GET message 824. According to typical web browser implementations, the web browser 832 removes the fragment from the URI prior to HTTP GET message 824 construction and, as such, the HTTP GET message 824 contains only the URI "https://www.domain.com/page." The web server 150 then sends an HTTP RESPONSE message 825 to the user device 130. The web browser then renders the received HTML to display the web page as part of URI retrieval and display.

To facilitate retrieval of dynamic and other data stripped from the URI, the web server 150 also includes JavaScript or another script in the HTTP RESPONSE 825 to instruct the user device 130 in how to transmit or otherwise use the stripped data. The web browser 832 then performs JavaScript execution 848 using the received JavaScript code. The received JavaScript instructs the web browser 832 to construct and transmit an HTTP POST message 827 including the fragment data "04223344556677x00001A." It will be understood that the JavaScript may also perform additional functions such as, for example, parsing of the fragment data and selection of only a subset of relevant fragment data for transmission with the HTTP POST message 827. Further, various alternative or additional formats and procedures may be employed for communicating with the web server 150 using the JavaScript such as, for example, Asynchronous JavaScript and XML (AJAX) methods. In response to the HTTP POST message 827, the web server 150 may send another HTTP RESPONSE message 828 including additional data or instructions to be used as part of JavaScript execution to provide various interactive functionality on the user device 130. It will be apparent that while JavaScript is described as enabling the use of stripped data, various other types of client-side scripts and processing may be employed to facilitate stripped data use.

According to the foregoing, various embodiments enable the digital signing and verification of dynamic data and other data not available at the time of signing. For example, by providing an NFC/NDEF implementation that strips data from, or otherwise preprocesses, NDEF records prior to signature verification, an NFC device may authenticate signed NDEF records in spite of the inclusion of data that was not present at the time of signature. Further, by configuring a web server to provide instructions for NFC device transmission of fragment data, various embodiments enable the use of the URI fragment for carrying dynamic data to be transmitted to a remote device. Various additional benefits will be apparent in view of the foregoing description.

It should be apparent from the foregoing description that various exemplary embodiments of the invention may be implemented in hardware. Furthermore, various exemplary embodiments may be implemented as instructions stored on a non-transitory machine-readable storage medium, such as a volatile or non-volatile memory, which may be read and executed by at least one processor to perform the operations described in detail herein. A machine-readable storage medium may include any mechanism for storing information in a form readable by a machine, such as a personal or laptop computer, a server, or other computing device. Thus, a non-transitory machine-readable storage medium excludes transitory signals but may include both volatile and non-volatile memories, including but not limited to read-only memory (ROM), random-access memory (RAM), magnetic disk storage media, optical storage media, flash-memory devices, and similar storage media.

It should be appreciated by those skilled in the art that any block diagrams herein represent conceptual views of illustrative circuitry embodying the principles of the invention. Similarly, it will be appreciated that any flow charts, flow diagrams, state transition diagrams, pseudo code, and the like represent various processes which may be substantially represented in machine readable media and so executed by a computer or processor, whether or not such computer or processor is explicitly shown.

Although the various exemplary embodiments have been described in detail with particular reference to certain exemplary aspects thereof, it should be understood that the invention is capable of other embodiments and its details are capable of modifications in various obvious respects. As is readily apparent to those skilled in the art, variations and modifications can be effected while remaining within the spirit and scope of the invention. Accordingly, the foregoing disclosure, description, and figures are for illustrative purposes only and do not in any way limit the invention, which is defined only by the claims.

What is claimed is:

1. A method performed by a near field communications (NFC) device for verifying a record received from an NFC tag, the method comprising:
    receiving an NFC data exchange format (NDEF) message by the NFC device from the NFC tag, wherein the NDEF message includes a payload, a digital signature, and a modified version of a uniform resource identifier (URI), wherein the digital signature was generated based on an original version of the URI;
    stripping a fragment from the URI to produce a stripped payload;
    verifying the payload using the digital signature and the stripped payload; and
    conditionally interpreting at least one of the payload and the stripped payload based on whether the payload is verified.

2. The method of claim 1, wherein the fragment is denoted by a pound character (#).

3. The method of claim 2, wherein the fragment comprises fragment data, and interpreting the payload further comprises:
    transmitting a request message requesting a resource identified by the URI, wherein the request omits the fragment data;
    receiving, in response to the request, a script;
    executing the script to transmit the fragment data to at least one device other than the NFC device.

4. The method of claim 1, wherein the URI comprises a query string denoted by a question mark character (?).

5. The method of claim 1, wherein the data is represented by a series of bits within the payload, and stripping data from the payload comprises:
    setting the series of bits to a value of zero.

6. The method of claim 1, wherein the NDEF message further includes a preprocessing identifier that indicates preprocessing is to be performed, and the step of stripping data from the payload is performed in response to a presence of the preprocessing identifier that indicates preprocessing is to be performed.

7. The method of claim 6, wherein the preprocessing identifier identifies either a first preprocessing type or a second preprocessing type, and the step of stripping data from the payload comprises:
    performing preprocessing according to the first preprocessing type based on the preprocessing identifier identifying the first preprocessing type; and
    performing preprocessing according to the second preprocessing type based on the preprocessing identifier identifying the second preprocessing type.

8. The method of claim 1, wherein verifying the payload further comprises:
    computing a computed hash value based on signed data carried by the NDEF message, wherein the signed data comprises the stripped payload;
    generating an expected hash value based on the digital signature; and
    determining whether the computed hash value matches the expected hash value.

9. A near field communications (NFC) device configured to verify a record received from an NFC tag, the NFC device comprising:
    an NFC reader configured to communicate with the NFC tag; and
    a processor configured to receive an NFC data exchange format (NDEF) message via the NFC reader, wherein the NDEF message includes a payload, a digital signature, and a modified version of a uniform resource identifier (URI), wherein the digital signature was generated based on an original version of the URI, strip a fragment from the URI to produce a stripped payload, verify the payload using the digital signature and the stripped payload, and conditionally interpret at least one of the stripped payload and the payload based on whether the payload is verified.

10. The NFC device of claim 9, wherein the fragment is denoted by a pound character (#).

11. The NFC device of claim 10, further comprising:
    a network interface, wherein the fragment comprises fragment data, and in interpreting the payload, the processor is configured to transmit, via the network interface, a request message requesting a resource identified by the URI, wherein the request omits the fragment data, receive, via the network interface, in response to the request, a script, and execute the script to transmit, via the network interface, the fragment to at least one device other than the NFC device.

12. The NFC device of claim 9, wherein the URI comprises a query string denoted by a question mark character (?).

13. The NFC device of claim 9, wherein: the data is represented by a series of bits within the payload, and in stripping data from the payload, the processor is configured to set the series of bits to a value of zero.

14. The NFC device of claim 9, wherein the NDEF message further includes a preprocessing identifier that indicates preprocessing is to be performed, and the processor is configured to perform the stripping of data from the payload in response to a presence of the preprocessing identifier that indicates preprocessing is to be performed.

15. The NFC device of claim 14, wherein the preprocessing identifier identifies either a first preprocessing type or a second preprocessing type, and, in stripping data from the payload, the processor is configured to perform preprocessing according to the first preprocessing type based on the preprocessing identifier identifying the first preprocessing type, and perform preprocessing according to the second preprocessing type based on the preprocessing identifier identifying the second preprocessing type.

16. The NFC device of claim 9, wherein, in verifying the payload, the processor is configured to compute a computed hash value based on signed data carried by the NDEF message, wherein the signed data comprises the payload, generate an expected hash value based on the digital signature, and determine whether the computed hash value matches the expected hash value.

17. A non-transitory machine-readable medium encoded with instructions for execution by a near field communications (NFC) device for verifying a record received from an NFC tag, the non-transitory machine-readable medium comprising:
  instructions for receiving an NFC data exchange format (NDEF) message by an NFC device from the NFC tag, wherein the NDEF message includes a payload, a digital signature, and a modified version of a uniform resource identifier (URI), wherein the digital signature was generated based on an original version of the URI;
  instructions for stripping a fragment from the URI to produce a stripped payload;
  instructions for verifying the payload using the digital signature and the stripped payload; and
  instructions for conditionally interpreting at least one of the stripped payload and the payload based on whether the payload is verified.

18. The non-transitory machine-readable medium of claim 17, further comprising:
  instructions for stripping the fragment denoted by a pound character (#) from the URI.

19. The non-transitory machine-readable medium of claim 17, further comprising:
  instructions for stripping a query string denoted by a question mark character (?) from the URI.

20. The non-transitory machine-readable medium of claim 17, wherein the instructions for stripping data from the payload are configured to be executed in response to the presence of a preprocessing identifier that indicates preprocessing is to be performed within the NDEF message.

* * * * *